(12) United States Patent
Perrin et al.

(10) Patent No.: US 8,826,225 B2
(45) Date of Patent: Sep. 2, 2014

(54) MODEL TRANSFORMATION UNIT

(75) Inventors: Oswald Perrin, Paris (FR); Gérard Naouri, Bievres (FR); Erwan Vezin, Paris (FR)

(73) Assignee: Accenture Global Services Limited, Dublin (IE)

( * ) Notice: Subject to any disclaimer, the term of this patent is extended or adjusted under 35 U.S.C. 154(b) by 457 days.

(21) Appl. No.: 13/124,787

(22) PCT Filed: Oct. 21, 2008

(86) PCT No.: PCT/IB2008/055365
§ 371 (c)(1),
(2), (4) Date: Oct. 28, 2011

(87) PCT Pub. No.: WO2010/046734
PCT Pub. Date: Apr. 29, 2010

(65) Prior Publication Data
US 2012/0042299 A1 Feb. 16, 2012

(51) Int. Cl.
*G06F 9/44* (2006.01)
(52) U.S. Cl.
CPC ........................ *G06F 8/10* (2013.01)
USPC .......................................... 717/104; 717/100
(58) Field of Classification Search
CPC ........................................................ G06F 8/10
USPC ........................................................ 717/104
See application file for complete search history.

(56) References Cited

U.S. PATENT DOCUMENTS

| | | | | |
|---|---|---|---|---|
| 6,487,566 B1 * | 11/2002 | Sundaresan | ................... | 715/235 |
| 2004/0060004 A1 * | 3/2004 | Mani et al. | ..................... | 715/513 |
| 2005/0022171 A1 * | 1/2005 | Langkafel et al. | ............ | 717/136 |
| 2006/0064666 A1 * | 3/2006 | Amaru et al. | ................. | 717/100 |
| 2007/0112878 A1 * | 5/2007 | Bennett et al. | ................ | 707/201 |
| 2008/0082959 A1 * | 4/2008 | Fowler | .......................... | 717/104 |
| 2008/0256124 A1 * | 10/2008 | Hernandez-Sherrington et al. | ......................... | 707/103 R |
| 2008/0263510 A1 * | 10/2008 | Nerome et al. | ............... | 717/104 |
| 2012/0042299 A1 * | 2/2012 | Perrin et al. | .................. | 717/104 |

OTHER PUBLICATIONS

Czarnecki, K.; Helsen, S., "Feature-based survey of model transformation approaches," IBM Systems Journal , vol. 45, No. 3, pp. 621,645, 2006.*

(Continued)

*Primary Examiner* — Don Wong
*Assistant Examiner* — Theodore Hebert
(74) *Attorney, Agent, or Firm* — Harrity & Harrity, LLP

(57) ABSTRACT

The invention concerns a model transformation unit adapted to transform a first source model in a source domain into a target model in a target domain, the first source model being a tree of source elements and the target model being a tree of target elements representing a project to be implemented in computer code, the model transformation unit including at least one memory adapted to store the first source model (104, 106), a source meta-model (204) representing the source domain, a target meta-model (206) representing the target domain, and a transformation model (210) indicating rules for transforming between the source meta-model and the target meta-model; and a transformation engine (102) adapted to determine, based on the transformation model, a parent element of each target element of the target model to be generated and to construct the target model by generating, for each source element in the source model to be transformed, a target element based on the transformation model, and by positioning each target element in the tree of target elements below its parent element.

20 Claims, 8 Drawing Sheets

(56) References Cited

OTHER PUBLICATIONS

Tom Mens and Pieter Van Gorp. 2006. A Taxonomy of Model Transformation. Electron. Notes Theor. Comput. Sci. 152 (Mar. 2006), 125-142.*

Hnatkowska et al., "On Understanding of Refinement Relationship", 3$^{rd}$ workshop on Consistency Problems in UML-based software development: understand and usage of dependency relationships. Lisbon, Portugal, Oct. 11, 2004. pp. 7-18.*

Czarnecki et al. ("Feature-based survey of model transformation approaches" 2006).*

Hnatkowska et al. ("On Understanding of Refinement Relationship" 2004).*

Mens et al. ("A Taxonomy of Model Transformation" 2006).*

International Search Report issued in PCT/IB2008/055365 on Mar. 31, 2009.

James Clark: "XSL Transformations (SXLT) Version 1.0", W3C Recommendation,, (Online) Nov. 16, 1999 pp. 1-51, XP002485798, Retrieved from the Internet: URL: http://www.w3.org/TR/xslt, p. 3, paragraph 109.

* cited by examiner

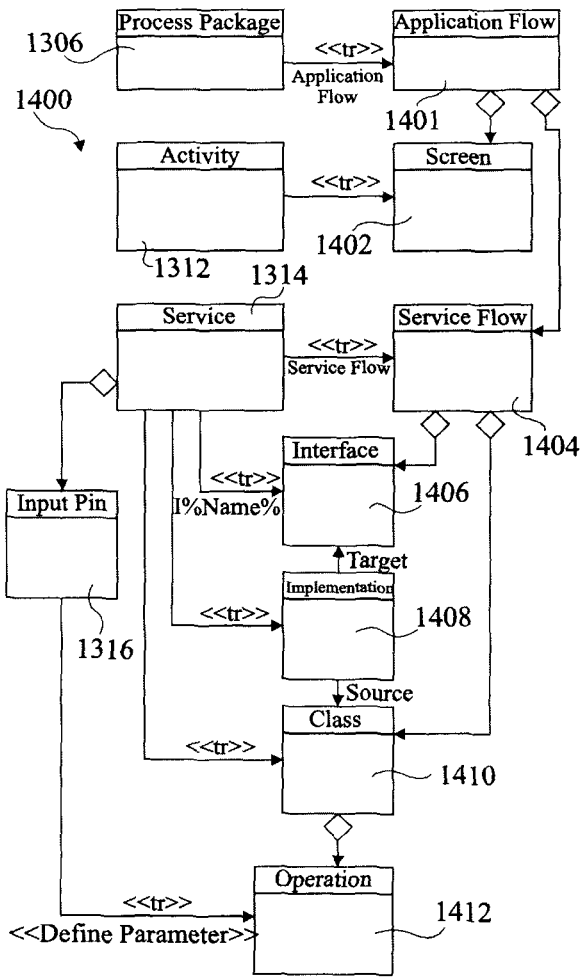
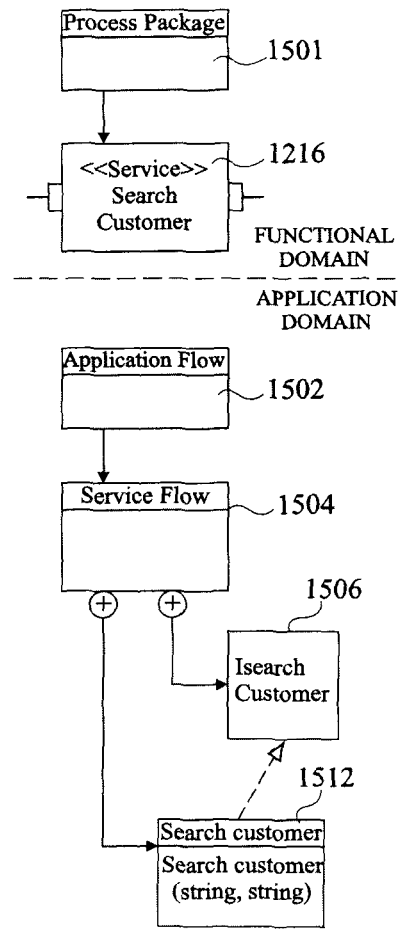
Fig 14          Fig 15
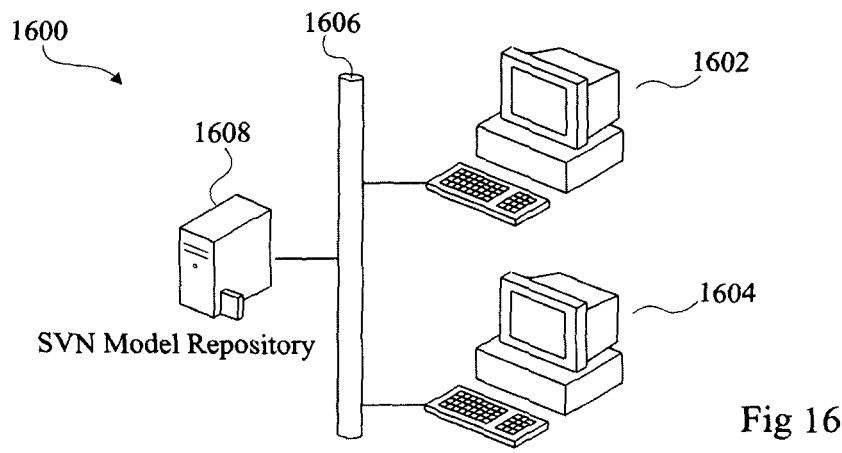
Fig 16

MODEL TRANSFORMATION UNIT

FIELD OF THE INVENTION

The present invention relates to a model transformation unit, and to a method of transforming models. In particular, the present invention relates to a unit and method for transforming a source model to a target model, the source and target models representing a software project.

BACKGROUND OF THE INVENTION

When designing complex software projects, it has been proposed to use models to represent the main aspects. Such an approach is known as the MDA (model driven architecture) approach, which was launched by OMG (Object Management Group).

Furthermore, a language known as Unified Modeling Language (UML) is a standardized modeling language that has been proposed by OMG for specifying, visualizing and constructing software systems.

Generally, the conception of a complex software project involves a number of different groups of designers, from business managers who determine the system requirements from a business perspective, to software engineers who develop the code for a specific platform. In between the business managers and software engineers, there are often designers specializing in functional aspects, and others specializing in applications or other aspects. Each group of designers for example represents aspects of the design using a modeling language.

A problem exists during this design process, as it is very difficult to ensure that the designs developed by the various groups all continue to respect the business requirements originally defined by the business managers. Thus there is a technical problem in maintaining coherence between the models at the various design levels.

A further problem with this design process is that it tends to be costly and inefficient in terms of the time spent by the various designers. In particular, there is a technical problem in permitting the reuse of existing software assets, for example previously developed models for different software projects, in new projects, meaning that a lot of work tends to be repeated.

SUMMARY OF THE INVENTION

Embodiments of the present invention aim to provide a model transformation unit and method of transforming models that at least partially address one or more problems in the prior art.

According to one aspect of the present invention, there is provided a model transformation unit adapted to transform a first source model in a source domain into a target model in a target domain, the first source model comprising a tree of source elements and the target model comprising a tree of target elements representing a project to be implemented in computer code, the model transformation unit comprising at least one memory adapted to store the first source model, a source meta-model representing the source domain, a target meta-model representing the target domain, and a transformation model indicating rules for transforming between the source meta-model and the target meta-model; and a transformation engine adapted to determine, based on the transformation model, a parent element of each target element of the target model to be generated and to construct the target model by generating, for each source element in the source model to be transformed, a target element based on the transformation model, and by positioning each target element in the tree of target elements below its parent element.

According to a further aspect of the present invention, there is provided a code ware generating system adapted to generate code ware, the code ware generating system comprising the above model transformation unit and a code generation engine adapted to generate code ware based on the target model.

According to a further aspect of the present invention, there is provide a method of transforming a first source model in a source domain into a target model in a target domain, the first source model comprising a tree of source elements and the target model comprising a tree of target elements representing a project to be implemented in computer code, the method comprising determining, based on a transformation model, parent elements of target elements in the target model to be generated; and constructing the target model by generating, for each source element in the source model to be transformed, a target element based on the transformation model, and by positioning each generated target element in the tree of target elements below its determined parent element.

According to yet a further aspect of the present invention, there is provided a storage medium storing a computer program for implementing the above method when executed on a computer.

Further embodiments of the present invention are recited in the dependent claims of this application.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which:

FIG. 14 is an example of a transformation model according to an embodiment of the present invention;

FIG. 15 illustrates the result of a transformation between the functional domain and the application domain according to an embodiment of the present invention; and FIG. 16 illustrates a system for transforming a model according to an embodiment of the present invention.

DETAILED DESCRIPTION OF THE INVENTION

Throughout the present application the following terms will be given the following definitions:
- model—a representation of an aspect of a software project, for example coded in UML (Unified Modeling Language) or UML2, although other languages could be used. The model has a tree structure comprising nodes, which are elements such as objects, and branches.
- meta-model—a representation of rules, constraints and properties of one or more models. Meta-models rule models, meaning that several models can instantiate the same meta-model, whereas a model generally refers to a single meta-model. Meta-models are types of models that also have a tree structure of nodes and branches, the nodes in this case being meta-classes.
- transformation model—a type of meta-model that defines a transformation from a source domain defined by a source meta-model to a target domain defined by a target meta-model.
- stereotype—a name attached to elements in a UML model.
- class—defines characteristics of an object, such as its attributes, fields and/or properties.
- meta-class—similar to class, but defines a UML type, such as a class, interface and actionflow, and a stereotype if needed, in a meta-model.
- object—an instance of a class. In other words, an object has the attributes, field and properties defined by a class. An object could be an activity block, interface, operation, or other entity, with inputs and outputs.
- element—the node of a tree in a model or meta-model, which could be any type of object.
- platform—a hardware and/or software framework that allows software to run. Examples of frameworks include Intel x86 or other hardware compatible with the Windows Operating system or Linux, supercomputers, Macintosh architectures and the Mac OS operating system, RISC (reduced instruction set computer) processors running UNIX etc.
- platform independent model (PIM)—a model that describes a software project at a sufficiently high level that it applies to more than one, and generally to a wide range of platforms.
- platform specific model (PSM)—a model that describes a software project at platform level, in other words defining code aimed at a particular platform.
- heap—area of memory used for dynamic memory allocation.

Models, meta-models, transformation models, PIMs and PSMs are all represented in a programming language, and are stored electronically as files in a volatile or non-volatile memory.

Figure 1:
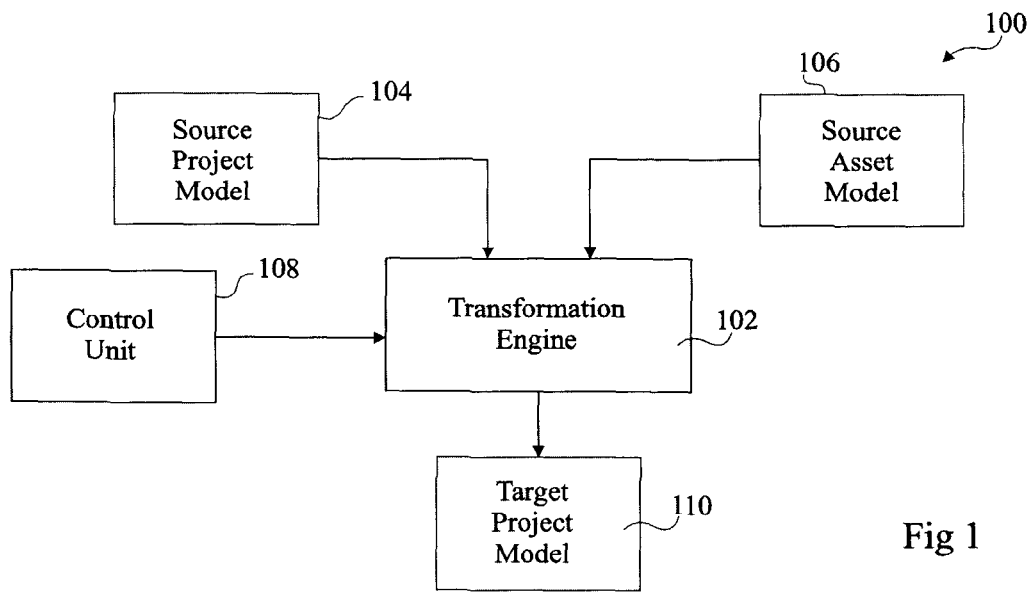
FIG. 1 is a block diagram illustrating a transformation unit according to an embodiment of the present invention.

FIG. 1 is a block diagram of a transformation unit 100. Transformation unit 100 comprises a transformation engine 102, which is coupled to a memory area 104 for receiving a source project model, and to a memory area 106 for receiving a source asset model. The transformation engine 102 is also coupled to a control unit 108 for receiving transformation rules indicating how the transformation is to be performed, and to a memory area 110 for outputting the target project model resulting from the transformation. Memory areas 104, 106, 108 and 110 are for example areas of one or more memory devices such as hard disk drives or other devices.

The transformation unit 100 transforms a source project model, which for example describes one or more aspects of a software project in one domain, into a target project model, which describes one or more aspects of the software project in a different domain. The domains are levels in the design process. As will be described in more detail below, the domains are for example the platform specific/platform independent domains. In other words, the source project model is for example a PIM, while the target project model and source asset model are for example PSMs. Alternatively, there may be more domains, and in particular, the source project model, source asset model and target model could be in any of a business domain, functional domain, application domain, technical domain, or code ware domain.

The source project model is for example a model in the source domain developed by engineers defining aspects of a software project. Alternatively, and particularly in the case that a backward transformation is performed, from a lower level to a higher level, the source project model could be automatically generated from another model. The source asset model is for example a model developed for a previous project that has some similarities with the present project, allowing at least part of it to be reused in the present project. The source asset model is generally in the same domain as the target model, thus allowing components of the asset model to be merged directly into the target model.

Figure 2:
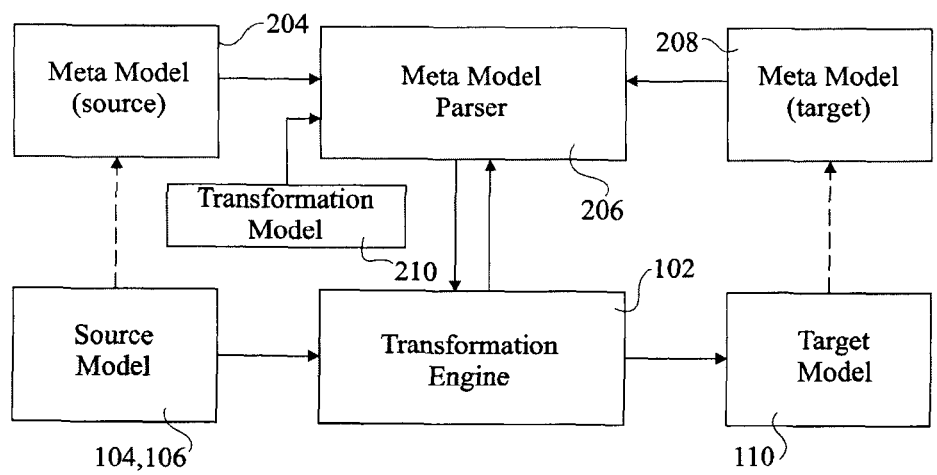
FIG. 2 is a block diagram illustrating circuitry of the transformation unit of FIG. 1 in more detail according to an embodiment of the invention.

FIG. 2 illustrates circuit blocks for performing the transformation.

A meta-model parser 206 is coupled to memory 204 to receive a source meta-model, and also to a memory 208 for receiving a target meta-model. The meta-model parser 206 reads and interprets meta-models, and provides an interface for the transformation engine 102 with these models. The source and target meta-models are for example defined by a user or otherwise generated, and define the source and target domains respectively.

The meta-model parser 206 also receives a transformation model stored by a memory 210. The meta-model parser 206 also reads the transformation model and provides an interface between the transformation engine 102 and this model. The transformation model defines rules for transforming between the source and target domains. In particular, the transformation model indicates the mapping of elements in the source domain to elements in the target domain. The transformation model is for example defined by a user or otherwise generated.

The transformation model is preferably represented graphically in a modeling language such as UML or UML2, for example in the form of a class diagram. This allows the transformation model to be quickly viewed and modified by a user. The meta-model parser 206 reads and interprets the transformation model.

In some transformations, such as a backward transformation, there is no source asset model, and in such cases, the transformation from the source project model to the target model is based only on the transformation model. However, when there is an asset model, the transformation is performed in two steps. In a first step, the target model is generated from the source project model, based on the transformation model. In the second step, the asset model is used to update the target model. In particular, whereas the transformation rules may broadly define the mapping between the source domain and the target domain, further details can be provided by an asset model.

Operation of the transformation unit of FIG. 2 for the transformation of a model between domains will now be described.

Initially, a validation of the source model can be performed to ensure that it conforms to the source meta-model.

The transformation engine 102 is for example a generic transformation engine that comprises tools for generating any elements defined by the target meta-model.

To construct the target model from the source model, both of which comprise a tree of elements, the transformation engine 102 first reads the source model, and for each element in the source model to be transformed, starting with the highest in the tree, the transformation engine determines and generates the corresponding one or more target elements in the target tree. In particular, the transformation engine reads each element, and based on its properties and attributes requests from the meta-model parser 206 the associated meta-class in the source meta-model, and the transformation relating to this source meta-class. The model-model parser 206 responds, indicating, based on the transformation model, the properties and attributes of the target meta-class or meta-classes, and the transformation engine 102 is then able to generate the necessary target elements.

The transformation engine 102 constructs the target model in the form of a tree, and in order to position each new element in the tree, it needs to know its parent element. Based on the properties and attributes of the target meta-class provided by the meta-model parser 206, the transformation engine 102 determines the parent element of the new target elements which are to be formed. To do this, the transformation engine 102 determines, with help from the meta-model parser 206, the parent meta-class of the meta-class corresponding to the new target element. The transformation engine 102 then performs a search in the source model for a source element having a meta-class that translates to this parent meta-class. For example, the meta-model parser 206 provides the properties and attributes defined by the source meta-class that transform into this target parent meta-class, and the transformation engine 102 searches for source elements having these attributes. Once found, it is determined that the parent target element is the target element generated from this source element.

Figure 3:
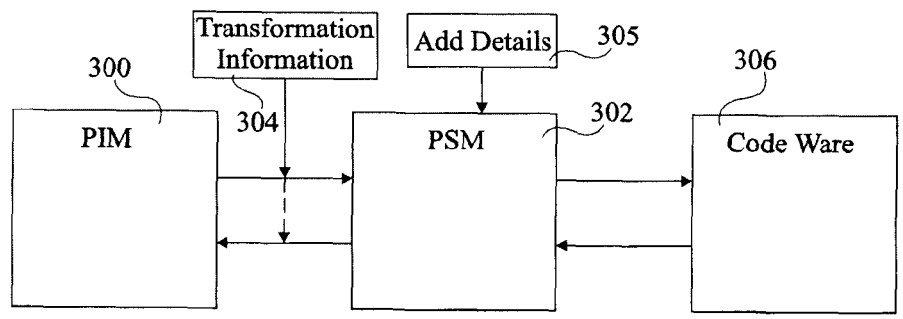
FIG. 3 is a block diagram illustrating model transformation according an embodiment of the present invention.

FIG. 3 illustrates an embodiment in which the source project model is a PIM, as indicated by block 300, and the target model is a PSM, as indicated by block 302. If there is a source asset model, it is for example also a PSM. Transformation between these models is performed by the transformation unit 100 based on a transformation model, as described above.

A block 304 between PIM 300 and PSM 302 represents the transformation information as provided by the transformation model. A block 305 provides a further input to PSM 302 so that details may be added by a user. In particular, and especially if there is no asset, additional details may be provided to generate the PSM.

From the PSM, code ware for a given platform is for example automatically generated by a code generation engine. The code ware in FIG. 3 is represented by block 306. Code ware is the software project in a specific programming language, such as Java, BPEL (Business Process Execution language), J2EE (Java 2 Enterprise Edition), Microsoft .Net, XML (extensible markup language), EAI (Enterprise Application Integration), WSDL (Web Services Description Language), or another platform specific programming language. It should be noted that one or more of the names mentioned in the present specification may be trademarks owned by others.

Arrows in both directions are shown between blocks 300, 302 and 306 in FIG. 3, indicating that transformations may be performed in both directions, either from the PIM domain to the PSM domain or vice versa. In particular, code ware can be used to generate the PSM, and the transformation unit can generate a PIM from a PSM, in other words the source of the transformation being a PSM, and the target a PIM.

Figure 4:
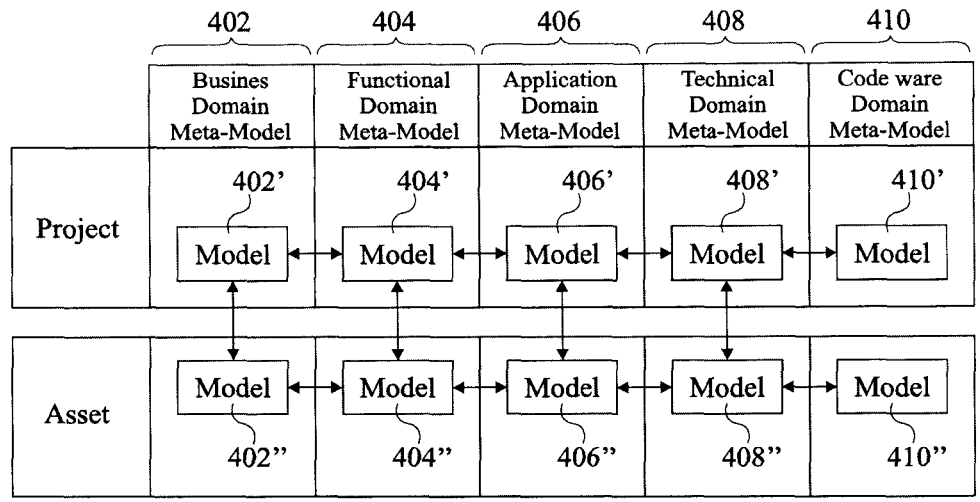
FIG. 4 is a block diagram illustrating model transformation according to yet a further embodiment of the present invention.

FIG. 4 illustrates an alternative to the embodiment of FIG. 3, in which a greater number of domains are provided. In particular, the transformation unit 100 can transform project models 402' in a business domain 402, project models 404' in a functional domain 404, project models 406' in an application domain 406, project models 408' in a technical domain 408 and project models 410' in a code ware domain 410. Each or some of these domains are for example defined by a corresponding meta-model. In parallel, asset models 402", 404", 406", 408" and 410" in the business domain 402, functional domain 404, application domain 406, technical domain 408 and code ware domain 410 respectively may be used to generate the project models 402' to 410', or assets may be generated based on these project models, as indicated by the two-way arrows between project models 402' to 410' and asset models 402" to 410". The business, functional and application domains are for example PIMs, while the technical and code ware domains are PSMs.

As an example, the project model 404', which is in the functional domain, could be generated as a target model from the project model 402', which is in the business domain, and the asset model 404", which is an asset in the functional domain. As a further example, asset model 408", which is in the technical domain, could be generated from asset model 410", which is a model in the code ware domain, or from the project model 408', thereby creating a new asset that may be used in future projects.

According to some of the embodiments described herein, models are for example represented by UML or UML2. These languages allow various representations of models. In particular, UML2 defines 13 diagrams grouped into static diagrams and behavioural diagrams.

Static diagrams are:
Package diagrams, showing how a system is split into logical groupings by showing dependencies among groupings;
Class diagrams, describing the structure of a system by showing the system's classes, their attributes and the relationships between classes;
Object diagrams, showing a complete or partial view of the structure of a modelled system at a particular time;
Component diagrams, showing the physical components of a software system, and dependencies among components;
Composite Structure diagrams, showing the internal structure of a class, and the collaborations that this structure makes possible, including internal parts, ports through which the parts interact, and connectors between parts or ports; and
Deployment diagrams, showing the hardware used in system implementations, components of the hardware, and associations between components.

Behavioural diagrams are:
Activity diagrams, showing business and operational step-by-step work flows of components in a system;
Use case diagrams, showing the relationships between a set of use cases;
State machine diagrams, showing a single object in terms of states in which it exists and transitions between states;
Sequence diagrams, showing different processes or objects that exist simultaneously as parallel vertical lines, and message exchanges between the processes or objects as horizontal arrows;
Interaction overview diagrams, showing an overview of the flow of control of interactions;
Communication diagrams, showing the interactions between objects or parts in terms of sequenced messages; and
Timing diagrams, showing the behaviour of objects throughout a given period of time.

The various levels shown in FIG. 4 for example have the following definitions:
Business domain—corresponds to a process view showing a business process, for example represented by business requirements, activity diagrams and high level class diagrams. Features that can be defined include high level processes, activities, actors and business objects. Furthermore, distribution can be differentiated from production, and channels can be identified, such as customers, branches, etc.
Functional domain—corresponds to a logical view, showing for example a functional representation such as a functional activity or functional use case represented using case diagrams, activity diagrams, state diagrams, class diagrams and sequence diagrams. Features that can be defined include processes, reusable activities, actors, decisions and entities.
Application domain—corresponds to a technology independent development view, showing for example a diagram of navigation, and can be represented by page designs, class diagrams, sequence diagrams, component diagrams, error management and composite structure. Features that can be defined include page flow, pages, business services, process components, referential components and integration (date mapping, etc.).
Technical domain—corresponds to a technology specific development view showing for example each class corresponding to one implementation diagram, defined within a meta-model based on the target execution architecture. Representations include, for example, implementation class diagrams, sequence diagrams, error management and composite structure.
Code ware domain—shows a model of the code, which is for example represented in Java, .Net or other language. A code cartridge is for example defined that can convert a UML model into lines of code.

Figure 5:
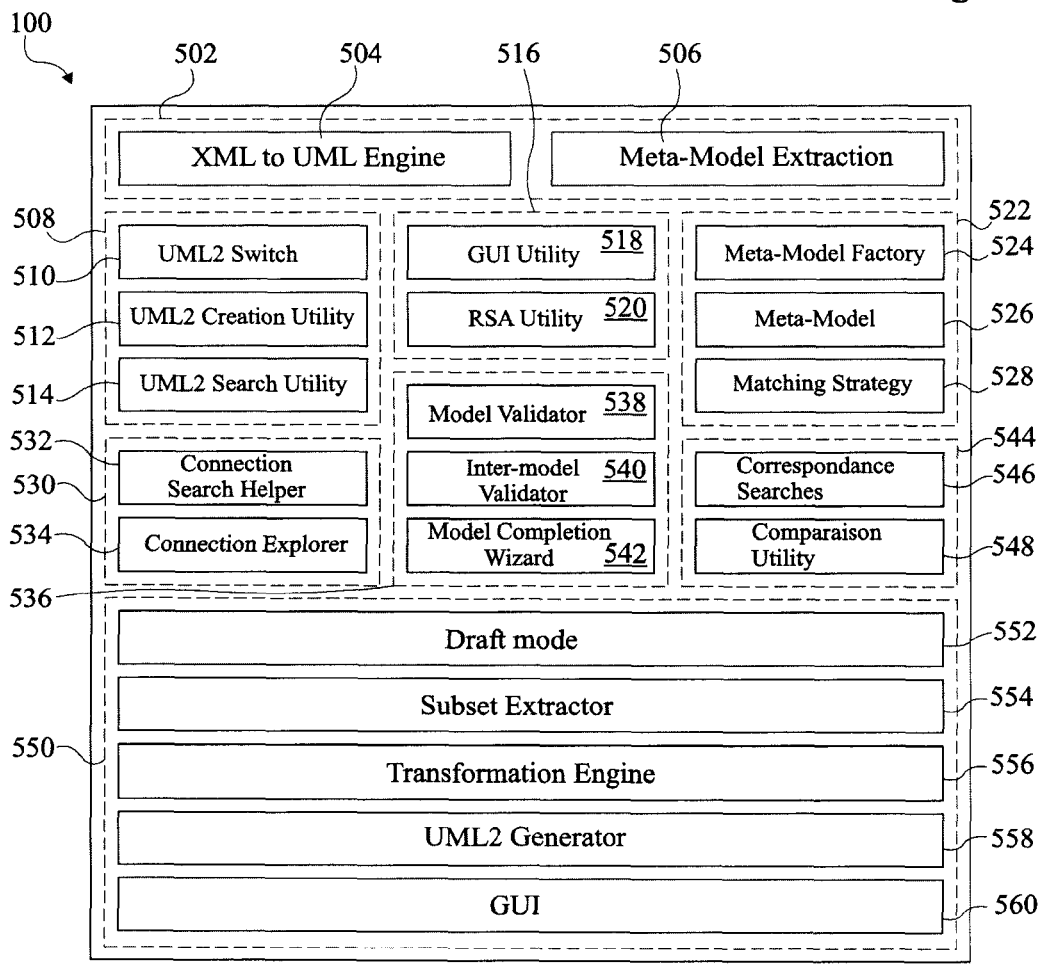
FIG. 5 illustrates a transformation unit in even more detail according to an embodiment of the present invention.

FIG. 5 illustrates the translation unit 100 in more detail, and in particular shows functional blocks of the translation unit 100, which are for example implemented in hardware and/or software. The functional blocks comprise:
an import block 502 comprising:
  an XML to UML engine 504, which converts an XML document into a UML diagram; and
  a meta-model extraction block 506, which analyzes the XML structure, and generates the associated meta-model.
a UML2 API (application programming interface) 508 comprising:
  a UML2 switch 510, which for example comprises a java switch for facilitating manipulation of UML2 elements, and in particular provides a means for extracting an inheritance tree of a UML2 hierarchy, for example for use in model validation;
  a UML2 creation utility 512, which creates UML2 elements; and
  a UML2 search utility 514, which provides operations for browsing models to find specific elements.
an RSA abstraction API 516 comprising:
  a GUI (graphical user interface) utility 518, which comprises widgets used by transformation wizards; and
  an RSA (rational software architect) utility 520, which comprises helpers for allowing creation or modification of diagrams, profiles etc.
a meta-model API 522 comprising:
  a meta-model factory 524, which performs instantiation of meta-models, for example converting a diagram into its java equivalent;
  a meta-model block 526, which is an engine that reads, for example, a UML model representing a meta-model and produces as an output the equivalent meta-model in Java, which can be manipulated more easily; and
  a matching strategy block 528, which fine tunes the matching between elements and meta-classes. In particular, each element in a UML model can be mapped to a corresponding meta-class. Such a mapping for example comprises initially finding a meta-class associated with all the elements of a branch of a model, and then finding the valid meta-class from the meta-model.
a connected elements API 530 comprising:
  a connection search helper 532, which retrieves all of the connected elements of one UML2 element; and
  a connection explorer 534, which executes the connected element algorithm and manages several heaps used during the search.
a model validation block 536 comprising:
  a model validator 538, which validates a model, and in particular checks that it conforms to a meta-model;
  an inter-model validator 540, which validates two models linked by a transformation model; and
  model completion wizards 542, which are wizards that launch validation.
an impact analysis API 544 comprising:
  a correspondence search block 546, which browses two models in order to find a pair of elements; and
  a comparison utility 548, which reads pairs that have been found by the correspondence search block, and determines their differences.
a generic transformation engine 550 comprising:
  a draft mode block 552, which manages a draft state during the transformation process;
  a subset extractor 554, which retrieves source elements to be transformed, which could be an entire model, or a subset of a model;
  a transformation engine 556, which is for example the engine 102 of FIG. 1, and performs the actual transformation;
  a UML2 generator 558, which acts as an output filter, and creates the target UML2 element; and
  a GUI 560, which comprises the wizards that launch the transformation.

The operation of various functional blocks of the transformation unit 100 will now be described in more detail with reference to the flow diagrams of FIGS. 6 to 11.

Figure 6:
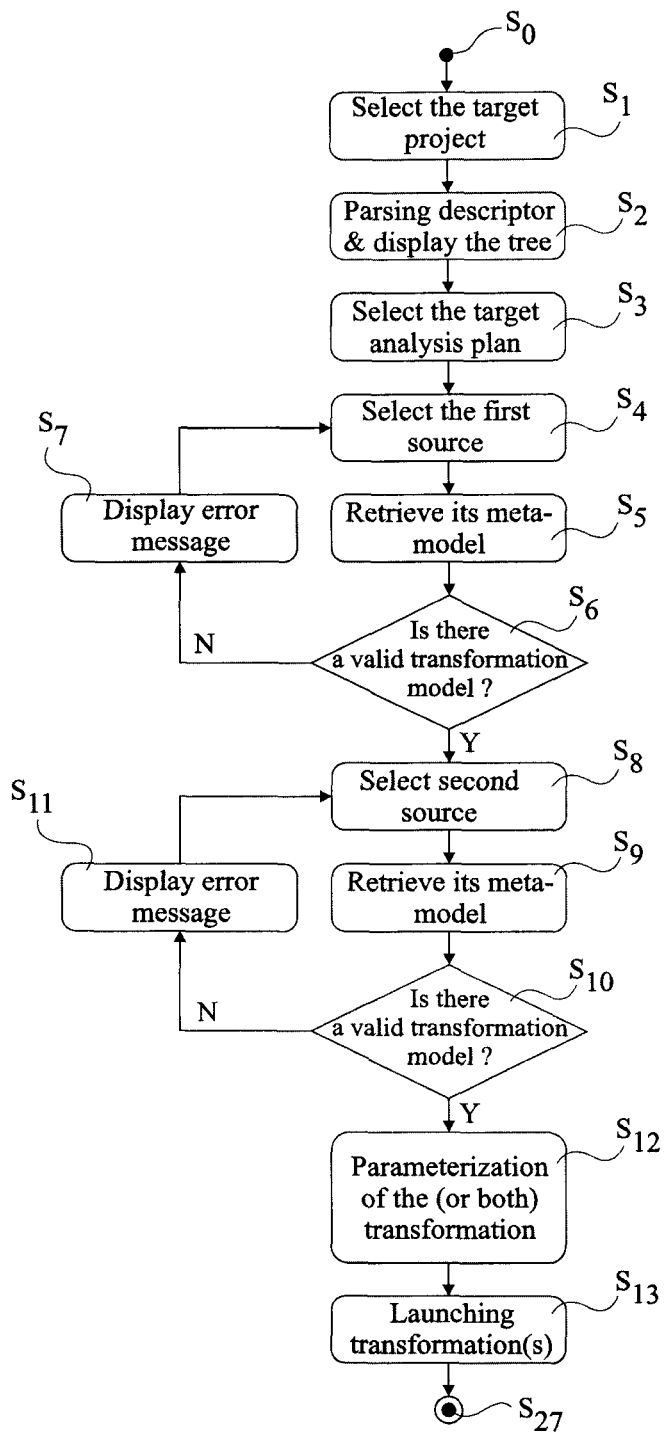
FIG. 6 is a flow diagram illustrating steps in a method of transforming a model according to an embodiment of the present invention.

FIG. 6 is a flow diagram illustrating steps in a method for initiating and launching a transformation as performed by the transformation engine 102, and in particular elements of the generic transformation engine 550 of FIG. 5.

The method starts at $S_0$. In a first step $S_1$, a target project model is selected, for example by locating by a user the area of a memory in which the target is stored. The target project model may be empty, or may already comprise one or more models in a source domain or other domain. In particular, the target project can contain models in multiple domains, from the business domain through to the code ware domain.

Next, in $S_2$, parsing of the descriptor is performed, and the tree is displayed. The descriptor is for example a file written in XML syntax that describes all of the available domains of the project, and the tree lists the available domains.

Next, in $S_3$, the target analysis plan is selected. This is the target domain, and thus once selected by a user a target meta-model is defined to the transformation unit.

Next, in $S_4$, a first source model is selected. The first source model is for example the source project model stored in an area of a memory, and it is located and selected by a user. It could for example be a source model that is part of the target project, or from a different project.

Next, in $S_5$, the meta-model associated with the first source model is retrieved. In particular, the user for example indicates the domain of the source model, and the transformation unit automatically retrieves a meta-model of this source domain. Alternatively, the source model may include an indication of its domain and even the file name of its corresponding meta-model, in which case the transformation unit reads this information from the source model and retrieves the meta-model.

Next, in $S_6$, it is determined whether there is a valid transformation model between the source domain and the target domain. The transformation unit for example automatically retrieves the transformation model, or requests that a user indicates the location in memory of the transformation model.

If no valid transformation model is found, the next step is $S_7$, in which an error message is displayed on a display screen associated with the transformation unit, and then the method returns to $S_4$, where to avoid a further error message the user could for example select a different source or target domain, or check that the transformation model is correctly defined.

If in $S_6$ a valid transformation model is found, the next step is $S_8$, in which a second source model is selected, if a second source is to be used for the transformation. The second source model is for example an asset model in the target domain, and is selected by locating by a user the memory area in which it is stored.

Next, in $S_9$, the meta-model of the second source model is retrieved in a similar fashion to retrieval of the first source meta-model as described above. The second source meta-model defines a second source domain, which is likely to be the same as the target domain, but could have differences with respect to the target domain meta-model.

Next, in $S_{10}$, it is determined whether there is a valid transformation model between the second source model and the target model. In the case that the domains of the second source model and the target model are the same, the transformation model may be simply to reproduce the second source model. However, if there are some difference between the second source domain and the target domain, the transformation model should indicate these differences.

If no valid transformation model is found, the next step is $S_{11}$, in which an error message is displayed on a display screen associated with the transformation unit, and then the method returns to $S_8$, where to avoid a further error message the user could for example select a different source or target domain, or check that the transformation model is correctly defined.

If in $S_{10}$ a valid transformation model is found, the next step is $S_{12}$, in which parameterization of the or both transformations is performed. This involves selecting by a user the transformation model to be used if more than one has been found.

After $S_{12}$, the next step is $S_{13}$, in which the one or two transformations are launched based on the first and, if selected, the second source models and the associated transformation model or models.

Once the transformations have been performed, we finish at $S_{27}$, the target project model now containing the transformed source model in the target domain.

Figure 7:
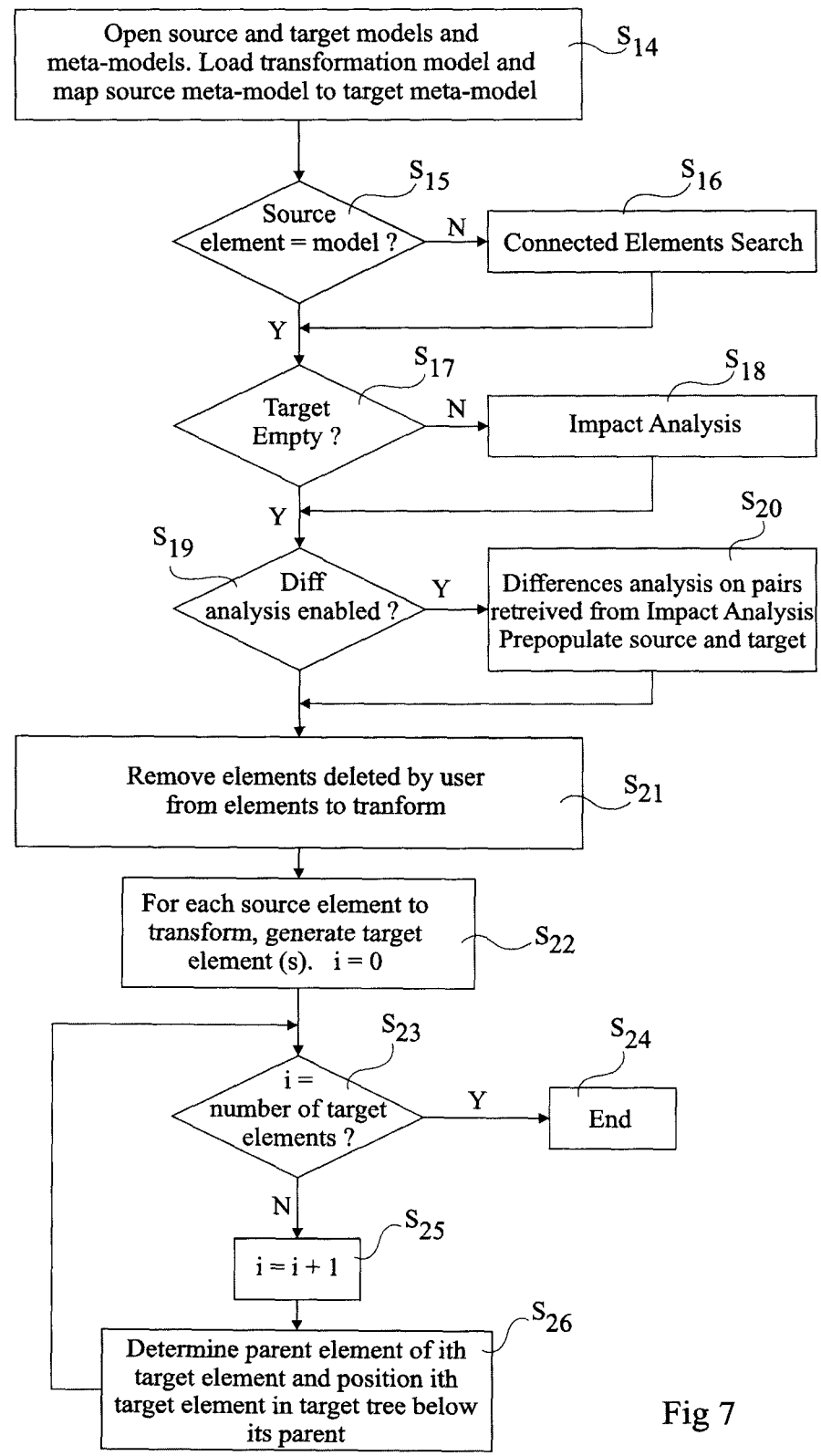
FIG. 7 is a flow diagram illustrating further steps in a method of transforming a model according to an embodiment of the present invention.

FIG. 7 is a flow diagram illustrating step $S_{14}$ to $S_{26}$ for launching the transformations of $S_{13}$ of FIG. 6 as will now be described.

In $S_{14}$, the source and target models and meta-models are opened and read, and the transformation model is loaded and used to map the source meta-model to the target meta-model.

The next step is $S_{15}$, in which it is determined whether or not the source element is a model. In particular, in $S_4$ of FIG. 6 above, the source is defined, and may comprise an entire model, or just one element of a model. For example, it may be that a model in the target domain has already been generated, and only one element is to be transformed.

If the source element is not a model, the next step is $S_{16}$, in which a connected elements search is performed, which will be described in more detail below. If the source element is a model, then all the elements of the source model are added to a stack of elements to transform, and the next step is $S_{17}$.

In $S_{17}$, it is determined whether or not the target is empty. In particular, if a model in the target domain already exists, resulting for example from either a previous transformation or an asset, the next step is $S_{18}$, in which impact analysis is performed. Impact analysis aims at preventing modifications already made by a user to the target model from being over written during transformation, and will be described in more detail below. On the other hand, if no model in the target domain exists, the target is empty, and the next step after $S_{17}$ is $S_{19}$. After $S_{18}$, the next step is also $S_{19}$.

In $S_{19}$, it is determined whether or not differences analysis is enabled. If so, the next step is $S_{20}$, in which differences analysis is performed on pairs retrieved during impact analysis. This step will be described in more detail below. The step after $S_{20}$ is $S_{21}$. If differences analysis is not enabled, the method goes directly from $S_{19}$ to $S_{21}$.

In $S_{21}$, elements that have been previously deleted or modified by a user are removed from the stack of elements to transform. Such elements are deleted or modified in the target model.

The next step is $S_{22}$, in which one or more target elements is generated for each source element to be transformed, as determined by the transformation model and target meta-model. An integer "i" is initiated at 0.

The next step is $S_{23}$, in which if integer "i" is equal to the number of target elements generated, the next step is $S_{24}$, in which the method ends. Assuming that there is at least one target element generated, at least the first time $S_{23}$ is executed, "i" is not equal to the number of target elements generated, and the next step is $S_{25}$.

In $S_{25}$, "i" is incremented, and then in the next step $S_{26}$, the parent element of the ith target element in the target tree is determined. The ith target element is then positioned in the tree below its parent element. Step $S_{23}$ is then repeated, such that the target tree is constructed with each target element placed below its parent.

Once steps S14 to S26 have been completed for a first source model, these steps are repeated for a second source model, for example for an asset model, if one has been designated.

An example of a method for searching for the location at which an element to be generated will be attached in a target model will now be described with reference to the flow diagrams of FIGS. 8 and 9. In particular, this search retrieves a parent element in the target model to which a generated element is to be attached.

The method starts at a point $S_0$.

In a first step $S_1$, the transformation unit searches for and finds the meta-class of the parent element of the element to be generated. This meta-class of the parent element will be referred to as the parent meta-class.

In the next step $S_2$, a list of source meta-classes are determined by the transformation unit that result, when transformed, in the parent meta-class determined in $S_1$. For example, this list can be determined based on the transformation model.

In the next step $S_3$, the transformation unit searches for and finds, based on the source meta-classes, the source element that transforms into the parent element. If the source element has not yet been transformed, a flag is set to trigger steps that will be described in more detail below with reference to FIG. 9.

In the next step $S_4$, the target parent element is retrieved, and the transformation of the element to be generated can be performed and positioned in the target model below this parent element.

Figure 8:
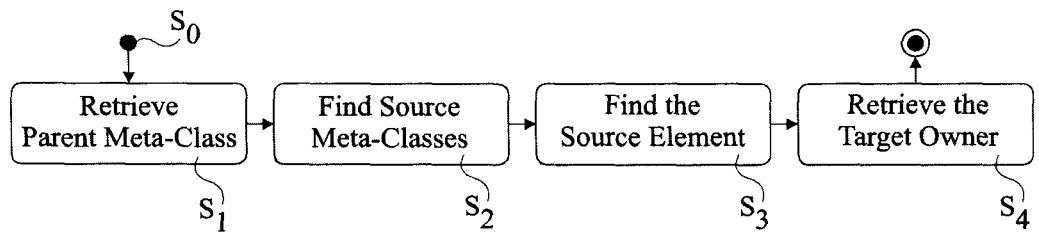
FIG. 8 is a flow diagram illustrating steps in a method for determining a parent element in a target tree according to embodiments of the present invention.
Figure 9:
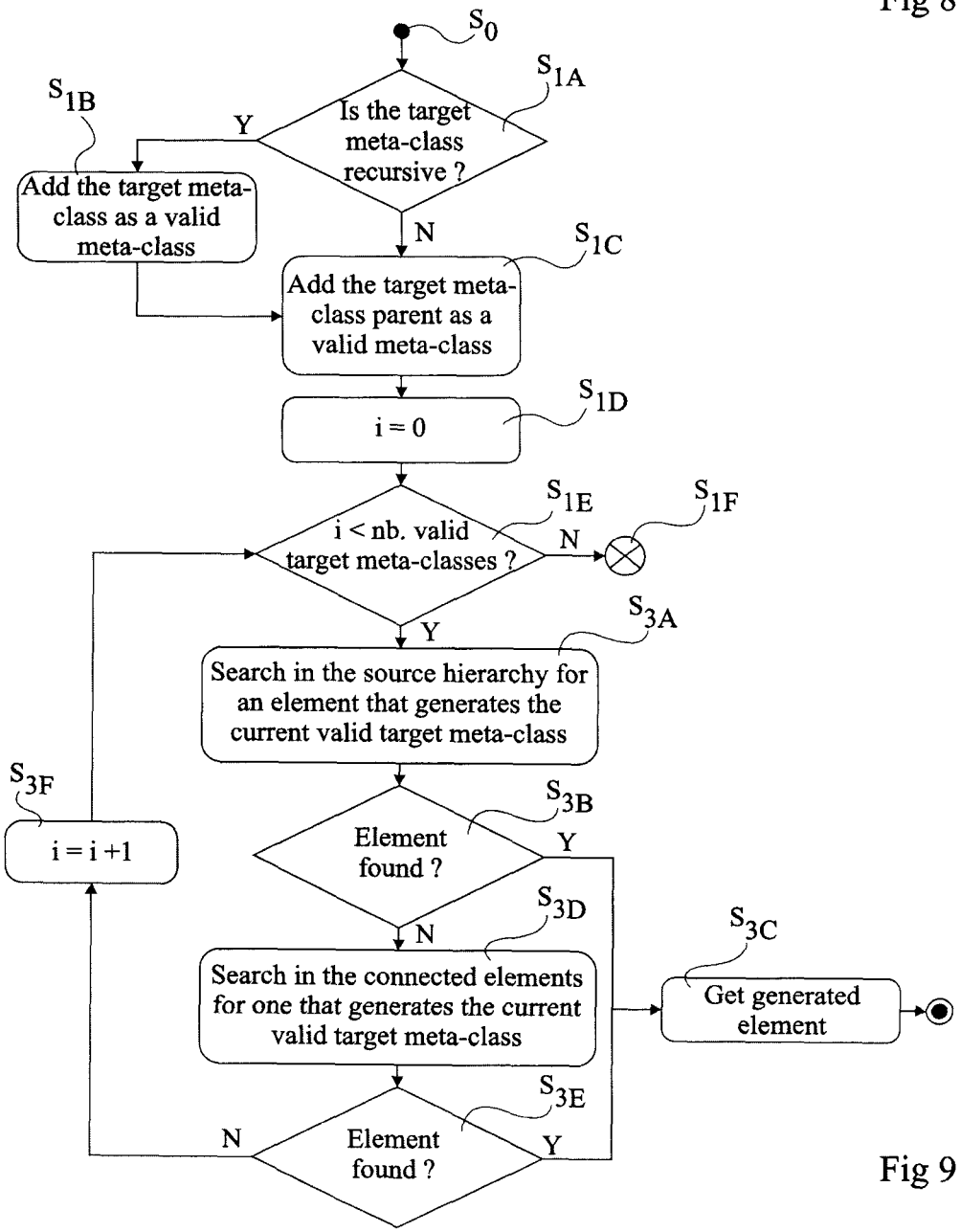
FIG. 9 is a flow diagram illustrating in more detail steps in the method for determining a parent element in a target model according to embodiments of the present invention.

FIG. 9 illustrates steps S1 and S3 of FIG. 8 in more detail for finding the source element that generates a target element parent, and dealing with recursive meta-classes.

In a first step $S_{1A}$ it is determined whether or not the target meta-class corresponding to the target element is recursive, meaning that it may comprise elements defined by its own meta-class. This corresponds to the situation flagged in $S_3$ of FIG. 8 above, in which the source element is not yet generated for the target parent element. In this case, the parent meta-class could have the same meta-class, and therefore in $S_{1B}$ the target meta-class is added as a valid meta-class, and the next step is $S_{1C}$. If the target meta-class is not recursive, the step after $S_{1A}$ is $S_{1C}$ directly.

In $S_{1C}$, the parent meta-class of the target meta-class is added as a valid meta-class.

Next, in step $S_{1D}$, an integer "i" is initiated at 0.

Next, in step $S_{1E}$, it is determined whether "i" is less than or equal to the number of valid meta-classes. If not, the method ends at $S_{1F}$, and it has not been possible to find the source element. Assuming that at least one valid target meta-class is found, at least on the first iteration this step will be positive, and the next step is $S_{3A}$.

In $S_{3A}$, a search is performed in the source hierarchy for an element that generates the current valid target meta-class. The current valid target meta-class is the ith meta-class in the list of valid meta-classes, which will initially be the 0th valid meta-class in the list.

Next, in $S_{3B}$, if an element has been found, this is determined to be the corresponding source element, and the next step is $S_{3C}$.

In $S_{3C}$, the generated target element corresponding to this source element is determined to be the parent target element, which can be used to position the target element. However, if no element is found in step $S_{3B}$, the next step is $S_{3D}$.

In $S_{3D}$, a search is performed among the elements connected to the source hierarchy for the element that generates the current valid target meta-class.

Next, in $S_{3E}$, it is again determined whether or not the source element has been found, and if so, the next step is $S_{3C}$, but if not, the next step is $S_{3F}$.

In $S_{3F}$, the integer "i" is incremented, and then step $S_{IE}$ is repeated until "i" is greater than or equal to the number of valid target meta-classes.

Figure 10:
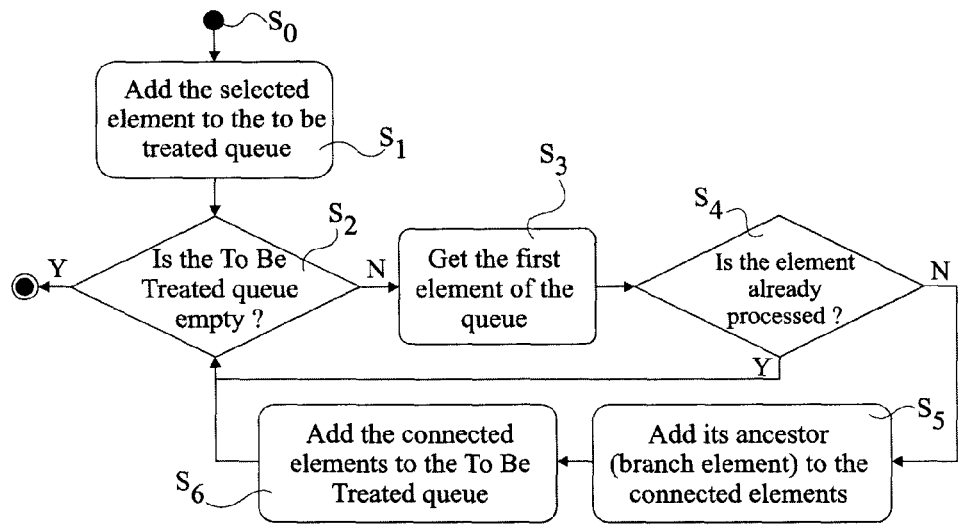
FIG. 10 is a flow diagram illustrating steps in a method for performing a connected elements search according to embodiments of the present invention.

FIG. 10 is a flow chart showing steps of a connected elements search implemented by the connected elements API 530 of FIG. 5. Steps $S_{3D}$ of FIG. 9 and $S_{16}$ of FIG. 7 use this connected elements search to find elements connected to a element in source hierarchy.

The method starts at $S_0$, and in a first step $S_1$, a selected element is added to a "to be treated" queue. The first element is the source element, which is an element of a model selected by a user, such as the root element of a model, or another element of the model. If the first element is the root element of a model, then the search will return all the elements in the model, whereas if the first element is another element in the model, the search will return a subset of the model.

In a next step $S_2$, it is determined whether the "to be treated" queue is empty, and if so, the method ends. Given that an element has just been added to the "to be treated" queue, at least on the first run this queue is not empty, and the next step is $S_3$.

In $S_3$, the first element of the queue is retrieved.

Next, in $S_4$, it is determined whether the element has already been processed. For example, if the element is also part of a previously processed branch, it may have already been processed. If so, it is removed from the "to be treated" queue, and the method returns to $S_2$. Otherwise, the next step is $S_5$.

In $S_5$, the ancestor, in other words the branch element, is added to a "connected elements" list.

Next, in $S_6$, connected elements from the "connected elements" list are added to the "to be treated" queue, and then $S_2$ is repeated.

Thus the connected elements search continues until no further branch elements are found, and all connected elements have been added to the "to be treated" queue.

Figure 11:
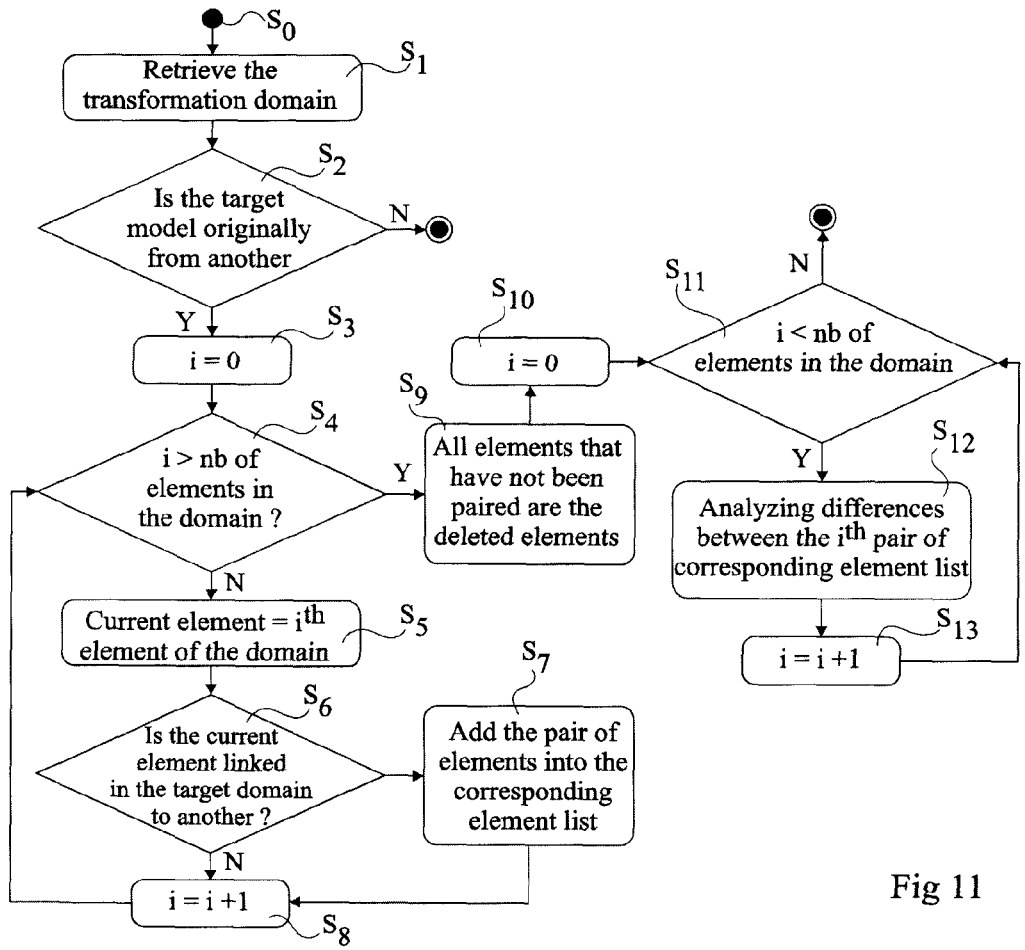
FIG. 11 is a flow diagram illustrating steps in a method for performing impact analysis according to embodiments of the present invention.

Impact analysis, which is implemented by the impact analysis API 544 of FIG. 5, will now be described with reference to the flow diagram of FIG. 11. This corresponds to S18 to S21 of FIG. 7. Impact analysis is performed in the case that transformation is to be performed in which a target model already exists. In particular, it may be that the target model comprises some elements that are the same as elements of the source model, but have for example been renamed by the user, and some elements may have been deleted by the user. These changes are applied when translating the source model to the target model.

The method starts at $S_0$, and in a first step $S_1$, the transformation domain is retrieved, which involves retrieving all of the source elements to be transformed.

Next, in $S_2$, it is determined whether or not the target model is originally from another model. If not, impact analysis is not performed, and therefore the method ends. However, if the target model is originally from another model, the next step is $S_3$.

In $S_3$, an integer "i" is set equal to "0".

Next, in $S_4$, if the value of "i" is greater than the number of elements in the domain, the next step is $S_9$. Otherwise, the next step is $S_5$.

In $S_5$, a "current element" is set as the ith element of the domain, which will be the 0th element the first time $S_5$ is executed.

Next, in $S_6$, it is determined whether or not the current element of the source domain is linked to an element in the target domain, in other words, whether it has already been transformed into an element in the target domain. For example, according to embodiments described herein, metadata associated with each element in the source domain indicates whether the source element has been used as the source of a transformation to an element in a target domain. If this information indicates that the source element has previously been transformed, the target domain is searched for the matching element. Source elements that have not previously been translated are new elements which will be translated during the translation step.

If there is a linked element, the next step is $S_7$, in which the pair of linked elements, in other words the current element in the source domain and the associated element in the target domain, are added to a corresponding element list. The next step after $S_7$, or after $S_6$ if no linked element is found, is $S_8$.

In $S_8$, the integer "i" is incremented by one, and then the method returns to step $S_4$, at which point steps S4 to S8 will be repeated until all of the elements in the domain have been analysed.

When all of the linked elements in the domain have been analysed, "i" is equal to one more than the number of elements, and therefore "i" is greater than the number of elements, and the step after $S_4$ is $S_9$.

In $S_9$, it is determined that all elements that have not been paired are the deleted elements. This is because these are the elements of the source domain that were not transformed in the target domain, and thus they are assumed to have been deleted by the user.

Next, in $S_{10}$, integer "i" is again set equal to "0".

Next, in $S_{11}$, it is determined whether or not "i" is less than the number of elements in the transformation domain. If not, the method ends. If so, the next step is $S_{12}$. In $S_{12}$, the differences between the ith pair of the corresponding element list are analysed. For example, differences could include a change of name or change of UML type, or there may be no difference at all.

Next, in $S_{13}$, the integer "i" is incremented, and then the method returns to step $S_{11}$. When all of the pairs of the corresponding element list have been analysed, "i" will be equal to the number of elements in the source domain, and therefore the method will end.

An example of the method of transforming a model by the transformation unit will now be described with reference to FIGS. 12 to 16.

Figure 12:
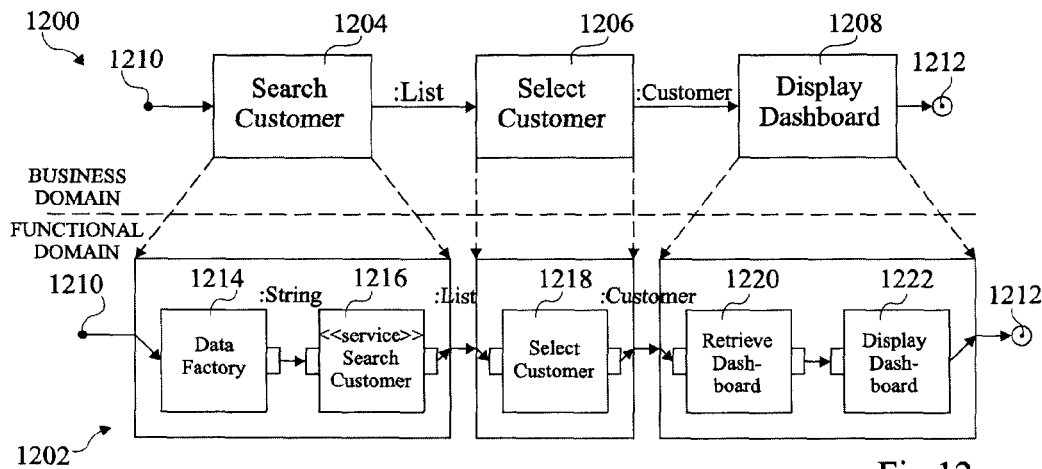
FIG. 12 is an example of models of a project shown in a business domain and a functional domain according to an embodiment of the present invention.

FIG. 12 illustrates an example of a source model 1200 and a target model 1202, the source model being in the business domain and the target model being in the functional domain.

The source model 1200 is represented by an activity diagram in the form of a tree comprising blocks 1204, 1206 and 1208, block 1204 performing the function "search customer" and outputting a list, block 1206 receiving the list from block 1204 and performing the function "select customer" and outputting a customer, and block 1208 receiving the customer from block 1206 and performing the function "display dashboard". The activities start at a start point 1210, and end at an end point 1212. For example, the block 1204 searches a customer database for a list of customer records responding to a search criterion, and outputs a list of search results. Block 1206 allows one of the list to be selected, for example by a user, and block 1208 displays details related to the selected customer.

The activity diagram 1200 is transformed into activity diagram 1202 in the functional domain, in which block 1204 becomes blocks 1214 and 1216, which perform the functions of "data entry" and "search customer" respectively with a data type "string" passing between them, while block 1206 becomes an equivalent block 1218, and block 1208 becomes the blocks 1220 and 1222 performing the functions "retrieve dashboard" and "display dashboard" respectively.

Figure 13A:
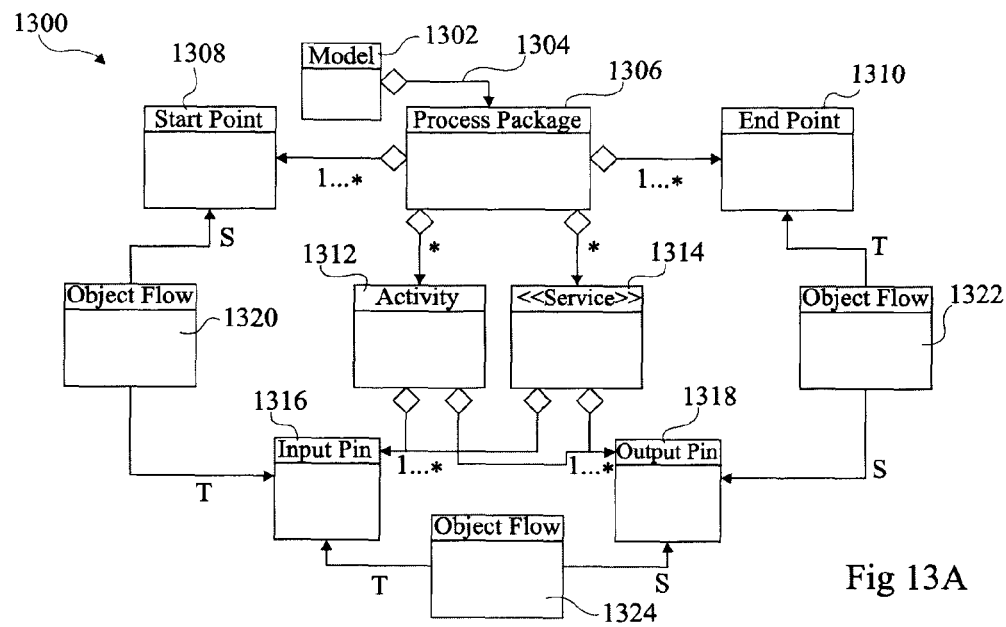
FIGS. 13A and 13B illustrate examples of meta-models for models in the functional domain according to embodiments of the present invention.

FIG. 13A illustrates a meta-model 1300 in the form of a class diagram describing the functional domain of the example of FIG. 12. As illustrated, the meta-class "model" shown by block 1302 owns, as indicated by a diamond and an arrow 1304, the process package 1306. When the term "owns" is used herein to say that a first meta-class owns a second meta-class, attribute or object, this means that the first meta-class comprises the second meta-class, attribute or object. The process package 1306 represents the package of functions and elements that make up the activities of the activity diagram. The process package in turn owns a start point 1308, defining the start point 1210 of FIG. 12, and end point 1310, defining the end point 1212 of FIG. 12, an activity 1312, which applies to blocks 1214, 1218, 1220 and 1222 of FIG. 12, and a service 1314, which applies to block 1216 of FIG. 12. Activity 1312 and service 1314 each own input pin 1316 and output pin 1318. While one input pin 1316 and one output pin 1318 have been shown, in alternative representations separate input and output pins could be shown for the activity 1312 and the service 1314.

The "service" in this example is a stereotype, meaning that it is a type that has been defined by a user.

Between start point 1308 and input pin 1316, and between end point 1310 and output pin 1318, and also between input pin 1316 and output pin 1318, object flows 1320, 1322 and 1324 respectively are defined, defining the flow of data between these nodes. Each object flow has a source and a target indicated by "S" and "T", showing the source and target of the data flow.

Figure 13B:
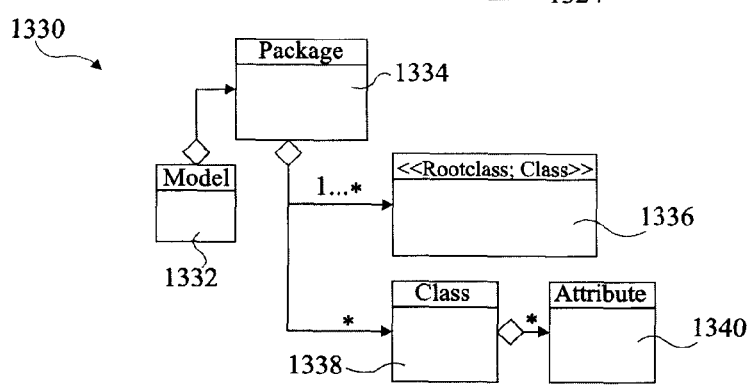

FIG. 13B illustrates another meta-model 1330 for the functional domain, in this case relating to a class model in the functional domain. Although not illustrated, a class model relating to the project of FIG. 12 would for example define the attributes of "customer", include the customer's name etc. The meta-model relating to class diagrams in the functional domain comprises a model 1332, which owns a package 1334, which in turn owns a block 1336 of stereotype "rootclass", and also a class 1338. Class 1338 in turn owns attributes 1340.

Although not shown in FIGS. 13A and 13B, each of the meta-classes for example define further attributes, such as more details relating to valid inputs etc. Furthermore, the labelling "*" on arrows between first and second meta-classes indicates that the first meta-class may comprise any number of the second meta-class, whereas the labelling "1..*" indicates that the first meta-class comprises at least one of the second metaclass.

FIG. 14 illustrates a transformation model 1400 for part of the meta-model of FIG. 13A, showing the transformation of the process package 1306, the activity 1312, the service 1314 and the input pin 1316 of the service in the functional domain into a model in the application domain. As illustrated by an arrow marked with the stereotype <<tr>>, process package 1306 in the functional domain is transformed into an application flow 1401. Similarly, activity 1312 is transformed to an object "screen" 1402, which defines screens that are displayed to a user. Service 1314 on the other hand is transformed into a component 1404, and into an interface 1406, implementation 1408 and class 1410. Interface 1406 and class 1410 are owned by component 1404. Input pin 1316, which is owned by service 1314 in the functional domain, is transformed into an operation 1412 in the application domain, owned by class 1410. Thus blocks 1402 to 1412 illustrate part of a meta-model defining the application domain. Screen 1402 and service flow 1404 are owned by application flow 1401.

An example of a transformation by the transformation unit will now be described with reference to FIG. 15 and the transformation model of FIG. 14.

FIG. 15 illustrates components in the functional domain which have been translated into components in the application domain. From the transformation model of FIG. 14, it is determined that the process package is translated into an application flow, and that the service "search customer" is translated into a component with an interface and a class, while the input pin of the service translates to an operation, and the service also provides an implementation between the operation and the interface.

Initially, the process package 1501 is translated into an application flow 1502 in accordance with the method described herein above, and is placed as the root element in the application domain. The service flow 1504, interface 1506, and search customer operation 1512 are then generated by the transformation engine. As indicated by labelling on the arrow in FIG. 14, the interface is given the prefix "I", followed by the name of the service, in this case "search customer".

To place the group of elements comprising the service flow 1504, the interface 1506 and the search customer operation 1512, the parent node of the service flow 1504 in the target model is used. Whereas the application flow 1502 could be automatically placed below the root element (not shown in FIG. 15), the parent element of the service flow 1504 is determined, as it could be either the root element or the application flow 1502.

As described above with reference to FIG. 8, initially the parent meta-class of the service flow 1504 is determined from the target meta-model, or translation model of FIG. 14, as the application flow 1401.

Next, the source meta-class, that is the source of the parent meta-class, is determined from the translation model as the process package 1306.

The source element in the functional domain corresponding to this meta-class is then determined as the process package 1501, as this is the only process package.

Finally, the target element generated from the process package 1501 is determined as the application flow 1502, which is thus identified as the parent target element. Service flow 1504 is built with this element as its parent node.

FIG. 16 illustrates a system 1600 for performing model transformations. As illustrated, the system 1600 comprises personal computers (PCs) 1602 and 1604, coupled to a network bus 1606, through which they have access to a model repository 1608, storing assets that can be used during transformations. Each of the PCs 1602, 1604 is for example used by a different team of designers to generate different parts of the software project. In this example, each PC 1602, 1604 is able to perform transformations to generate models in a project based on source models that may be stored in memories of the PCs or a memory in the model repository.

The transformation unit described herein advantageously allows a model to be transformed from a source domain to a target domain in a simple fashion by automatically constructing and positioning each element of the target tree of the target model based on its parent. In particular, an alternative solution could be to perform the transformation in script, indicating directly to the transformation unit the location in the target model of each element. However, such a solution introduces the technical problem that new script needs to be written for each transformation, making the process difficult and time consuming.

A further advantage of embodiments of the invention is that the parent element of each target element to be generated in the target model is determined based on the transformation model and/or source and target meta-models, and thus can be performed in a simplified and efficient manner, increasing the speed of the transformation engine, and thereby reducing its processing requirements.

A further advantage of embodiments of the invention is that when the source model is part of a larger model, a connected elements search is performed to determine all the elements to be transformed. This avoids any potential inconsistencies between parts of the larger model.

A further advantage of embodiments of the invention is that when a target model already exists before transformation of the source model is performed, impact analyse is performed as described above to ensure that differences between elements introduced by a user are preserved.

A further advantage of embodiments of the invention is that a five level hierarchy of domains is provided, as shown in FIG. 4.

Having thus described at least one illustrative embodiment of the invention, various alterations, modifications and improvements will readily occur to those skilled in the art.

In particular, it will be apparent to those skilled in the art that while a system having five design levels, from a business domain to code ware domain, has been described, in alternative embodiments, a different number and/or different types of levels/domains could be used, and a transformation could be performed directly between levels/domains that are not adjacent to each other.

Furthermore, it will be apparent that while some examples of languages used for the representation of models has been provided, alternative languages could be used.

Furthermore, it will be apparent to those skilled in the art that features of the various embodiments described herein could be implemented in hardware or software, or a combination of each, and alternative embodiments of the present invention could comprise any combination of the various features described.

The invention claimed is:

1. A model transformation unit comprising:
at least one memory to store instructions; and
a processor to execute the instructions to:
identify a source model in a source domain;
identify a target model in a target domain,
the target domain being different than the source domain;
receive a transformation model,
the transformation model including information defining rules for transforming elements in the source model to elements in the target model;
identify the elements in the source model;
generate, based on the transformation model, the elements in the target model that correspond to the identified elements in the source model, the processor, when generating the elements in the target model, being to:
    read each of the identified elements in the source model;
    determine a respective property associated with each of the identified elements in the source model;
    identify respective meta information, from another model, associated with each of the identified elements in the source model,
        the other model being identified based on information associated with a domain of the source model, and
        the other model being different than the source model and being different than the target model; and
    generate the elements in the target model using the determined respective property and the identified respective meta information; and
construct, using the generated elements, the target model,
    the target model including a tree of target elements, and
    the processor, when constructing the target model, being to:
        determine, for each generated target element, a parent element by identifying an element in the source model that is associated with a parent meta-class and using the identified element as the parent element; and
        position, in the tree of target elements, each generated target element below the determined parent element.

2. The model transformation unit of claim 1, where
each generated element is defined by a meta-class, and
the processor, when determining the parent element for each generated target element, is further to:
    determine the parent meta-class of the meta-class defining each generated target element.

3. The model transformation unit of claim 1, where
the memory is further to:
    store another source model; and
the processor is further to:
    use the other source model to construct the target model.

4. The model transformation unit of claim 1, where
the source model is part of another model, and
the processor is further to:
    search for ancestor elements and child elements of the elements in the source model to determine the elements in the source model to be transformed.

5. The model transformation unit of claim 1, where the processor is further to:
    determine one or more differences between the elements in the target model and the elements in the source model; and
    use the determined one or more differences between the elements in the target model and the elements in the source model to construct the target model.

6. The model transformation unit of claim 1, where the processor is further to:
    provide an interface between the source model, the target model, and the transformation model.

7. The model transformation unit of claim 1, where the source model is a platform independent model (PIM) and the target model is a platform specific model (PSM).

8. The model transformation unit of claim 1, where at least one of the source model or the target model is:
    a model in a business domain representing platform independent processes;
    a model in a functional domain representing platform independent functions;
    a model in an application domain representing platform independent applications;
    a model in a technical domain representing platform specific aspects; or
    a model in a codeware domain representing computer code for a specific platform.

9. The model transformation unit of claim 1, where the source model and the target model are represented in UML (unified modeling language).

10. A method comprising:
identifying, by a device, a source model in a source domain;
identifying, by the device, a target model in a target domain,
    the target domain being different than the source domain;
receiving, by the device, a transformation model,
    the transformation model including information defining rules for transforming elements in the source model to elements in the target model;
identifying, by the device, the elements in the source model;
generating, by the device and based on the transformation model, the elements in the target model that correspond to the identified elements in the source model,
    the generating including:
        reading each of the identified elements in the source model;
        determining a respective property associated with each of the identified elements in the source model;
        identifying respective meta information, from another model, associated with each of the identified elements in the source model,
            the other model being identified based on information associated with a domain of the source model, and
            the other model being different than the source model and being different than the target model; and
        generating the elements in the target model using the determined respective property and the identified respective meta information; and
constructing, by the device and using the generated elements, the target model,
    the target model including a tree of target elements, and
    the constructing including:
        determining, for each generated target element, a parent element by identifying an element in the source model that is associated with a parent meta-class and using the identified element as the parent element; and
        positioning, in the tree of target elements, each generated target element below the determined parent element.

11. The method of claim 10, where
each generated target element is defined by a meta-class, and
when determining the parent element for each generated target element, the method includes:
    determining the parent meta-class of the meta-class defining each generated target element.

12. The method of claim 10, where
the source model is part of another model, and
the method further includes:
performing a search for ancestor elements and child elements of the elements in the source model to determine the elements in the source model to be transformed.

13. The method of claim 10, where, when determining the parent element for each generated target elements, the method includes:
determining, using property and attribute information associated with the other model, elements in the source model that have a meta-class that translates into a meta-class associated with each generated element in the target model; and
using the determined elements in the source model that have a meta-class that translates into the meta-class associated with each generated element in the target model to construct the target model.

14. A non-transitory computer readable medium storing instructions, the instructions comprising:
one or more instructions which, when executed by a processor, cause the processor to:
identify a source model in a source domain;
identify a target model in a target domain,
the target domain being different than the source domain;
receive a transformation model,
the transformation model including information defining rules for transforming elements in the source model to elements in the target model;
identify the elements in the source model;
generate, based on the transformation model, the elements in the target model that correspond to the identified elements in the source model,
the one or more instructions to generate the elements in the target model including:
one or more instructions to read each of the identified elements in the source model;
one or more instructions to determine a respective property associated with each of the identified elements in the source model;
one or more instructions to identify respective meta information, from another model, associated with each of the identified elements in the source model,
the other model being identified based on information associated with a domain of the source model, and
the other model being different than the source model and being different than the target model; and
one or more instructions to generate the elements in the target model using the determined respective property and the identified respective meta information; and
construct, using the generated elements, the target model,
the target model including a tree of target elements, and
the one or more instructions to construct the target model including:
one or more instructions to determine, for each generated target element, a parent element by identifying an element in the source model that is associated with a parent meta-class and using the identified element as the parent element; and
one or more instructions to position, in the tree of target elements, each generated target element below the determined parent element.

15. The non-transitory computer readable medium of claim 14, where
each generated element is defined by a meta-class, and
the one or more instructions to determine the parent element for each generated target element include:
one or more instructions to determine the parent meta-class of the meta-class defining each generated target element.

16. The non-transitory computer readable medium of claim 14, where
the source model is part of another model, and
the instructions further include:
one or more instructions to perform a search for ancestor elements and child elements of the elements in the source model to determine the elements in the source model to be transformed.

17. The non-transitory computer readable medium of claim 14, where the one or more instructions to determine the parent element for each generated target elements include:
one or more instructions to determine, using property and attribute information associated with the other model, elements in the source model that have a meta-class that translates into a meta-class associated with each generated element in the target model; and
one or more instructions to use the determined elements in the source model that have a meta-class that translates into the meta-class associated with each generated element in the target model to construct the target model.

18. The non-transitory computer readable medium of claim 14, where the instructions further include:
one or more instructions to store another source model; and
one or more instructions to use the other source model to construct the target model.

19. The method of claim 10, further comprising:
storing another source model; and
using the other source model to construct the target model.

20. The method of claim 10, further comprising:
determining one or more differences between the elements in the target model and the elements in the source model; and
using the determined one or more differences between the elements in the target model and the elements in the source model to construct the target model.

* * * * *